US008386392B2

(12) United States Patent
Bhogal et al.

(10) Patent No.: US 8,386,392 B2
(45) Date of Patent: *Feb. 26, 2013

(54) SOFTWARE LICENSE AGREEMENT AMONGST WORKGROUPS USING SOFTWARE USAGE DATA

(75) Inventors: Kulvir Singh Bhogal, Pflugerville, TX (US); Travis M. Grigsby, Austin, TX (US); Robert Ross Peterson, Austin, TX (US); Lisa Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,738

(22) Filed: Feb. 28, 2012

(65) Prior Publication Data

US 2012/0158881 A1    Jun. 21, 2012

Related U.S. Application Data (63) Continuation of application No. 12/501,547, filed on Jul. 13, 2009, now Pat. No. 8,260,715.

(51) Int. Cl.
 *G06F 21/00* (2006.01)
(52) U.S. Cl. .............................. 705/59; 726/27; 705/902
(58) Field of Classification Search ..................... 705/59
 See application file for complete search history.

(56) References Cited

U.S. PATENT DOCUMENTS

| | | | | |
|---|---|---|---|---|
| 5,579,222 | A | 11/1996 | Bains et al. | 717/167 |
| 5,671,412 | A | 9/1997 | Christiano | 1/1 |
| 5,717,604 | A | 2/1998 | Wiggins | 709/229 |
| 5,742,757 | A | 4/1998 | Hamadani et al. | 726/32 |
| 7,203,844 | B1 | 4/2007 | Oxford | 713/193 |
| 7,231,370 | B1 | 6/2007 | Kapur | 705/59 |
| 2003/0084343 | A1 | 5/2003 | Ramachandran et al. | 713/201 |
| 2003/0172035 | A1 | 9/2003 | Cronce et al. | 705/59 |
| 2004/0010471 | A1 | 1/2004 | Lenard et al. | 705/59 |
| 2004/0078339 | A1 | 4/2004 | Goringe et al. | 705/59 |
| 2005/0033967 | A1 | 2/2005 | Morino et al. | 713/182 |
| 2005/0049973 | A1 | 3/2005 | Read et al. | 705/59 |
| 2005/0289072 | A1 | 12/2005 | Sabharwal | 705/59 |
| 2006/0085350 | A1 | 4/2006 | Samayamantry et al. | 705/59 |
| 2006/0143134 | A1 | 6/2006 | So et al. | 705/59 |
| 2007/0219917 | A1 | 9/2007 | Liu et al. | 705/59 |
| 2010/0057674 | A1 | 3/2010 | O'Donnell | 707/3 |
| 2010/0333211 | A1 | 12/2010 | Schonfeld et al. | 726/28 |
| 2011/0010216 | A1 | 1/2011 | Bhogal et al. | 705/8 |

OTHER PUBLICATIONS

"HP License Management Service," Hewlett-Packard Company, Apr. 2003, 4 pages.
"IBM Tivoli License Compliance Manager," International Business Machines Corporation, 2006, 4 pages.
"Insystek Inventory Manager," INSYSTEK, Nov. 23, 2005, 3 pages.
Olsen, "Tame your software licensing agreement," Compliance Pipeline, Mar. 13, 2006, 3 pages.
"Simlog Software Licensing," Simlog, 2007-2011, 1 page.

*Primary Examiner* — Jacob C. Coppola
(74) *Attorney, Agent, or Firm* — VanLeeuwen & VanLeeuwen; Jeffrey S. LaBaw (57) ABSTRACT

A license handling information handling system receives an electronic message from a first computer system utilized by a first user. The first user's message requests a license to a licensed product that has previously been purchased by the organization. The license handling information handling system identifies a second user in the organization that currently has a license to the licensed product, and requests that the second user relinquish the license to the licensed product. The second user indicates that the second user's license will be relinquished for a temporary time period. The licensing handling information handling system sends an electronic message, including the temporary time period, to the first user. In response to the first user accepting the temporary time period, the second user's license to the licensed product is revoked, and the first user is granted a license to the licensed product.

12 Claims, 8 Drawing Sheets

SOFTWARE LICENSE AGREEMENT AMONGST WORKGROUPS USING SOFTWARE USAGE DATA

RELATED APPLICATION

This application is a continuation of U.S. application Ser. No. 12/501,547, filed Jul. 13, 2009, titled "Software License Usage Amongst Workgroups Using Software Usage Data," and having the same inventors as the above-referenced application.

BACKGROUND OF THE INVENTION

1. Technical Field

The present invention relates to managing licensed products amongst a group of users. More particularly, the present invention relates to license handling information handling system that revokes and grants licenses to users based on need calculations.

2. Description of the Related Art

It is often the case that a company can only afford to purchase a finite number of software licenses for software applications. This results in a number of software CDs sitting around not being used or applications being installed but not used while a number of employees are left out from using this software because there are no available licenses. This in turn leads to enterprises over spending when they could benefit from using existing software licenses that are not used.

SUMMARY

An approach is provided using a license handling information handling system that receives, over a computer network, an electronic message at the license handling information handling system from a first computer system utilized by a first user. The first user's message requests a license to a licensed product that has previously been purchased by the organization. The license handling information handling system identifies a second user in the organization that currently has a license to the licensed product, and requests that the second user relinquish the license to the licensed product. The second user indicates that the second user's license will be relinquished for a temporary time period. The licensing handling information handling system sends an electronic message, including the temporary time period, to the first user. The first user may accept the temporary time period. In response to the first user accepting the temporary time period, the second user's license to the licensed product is revoked by the license handling information handling system and the first user is granted a license to the licensed product.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
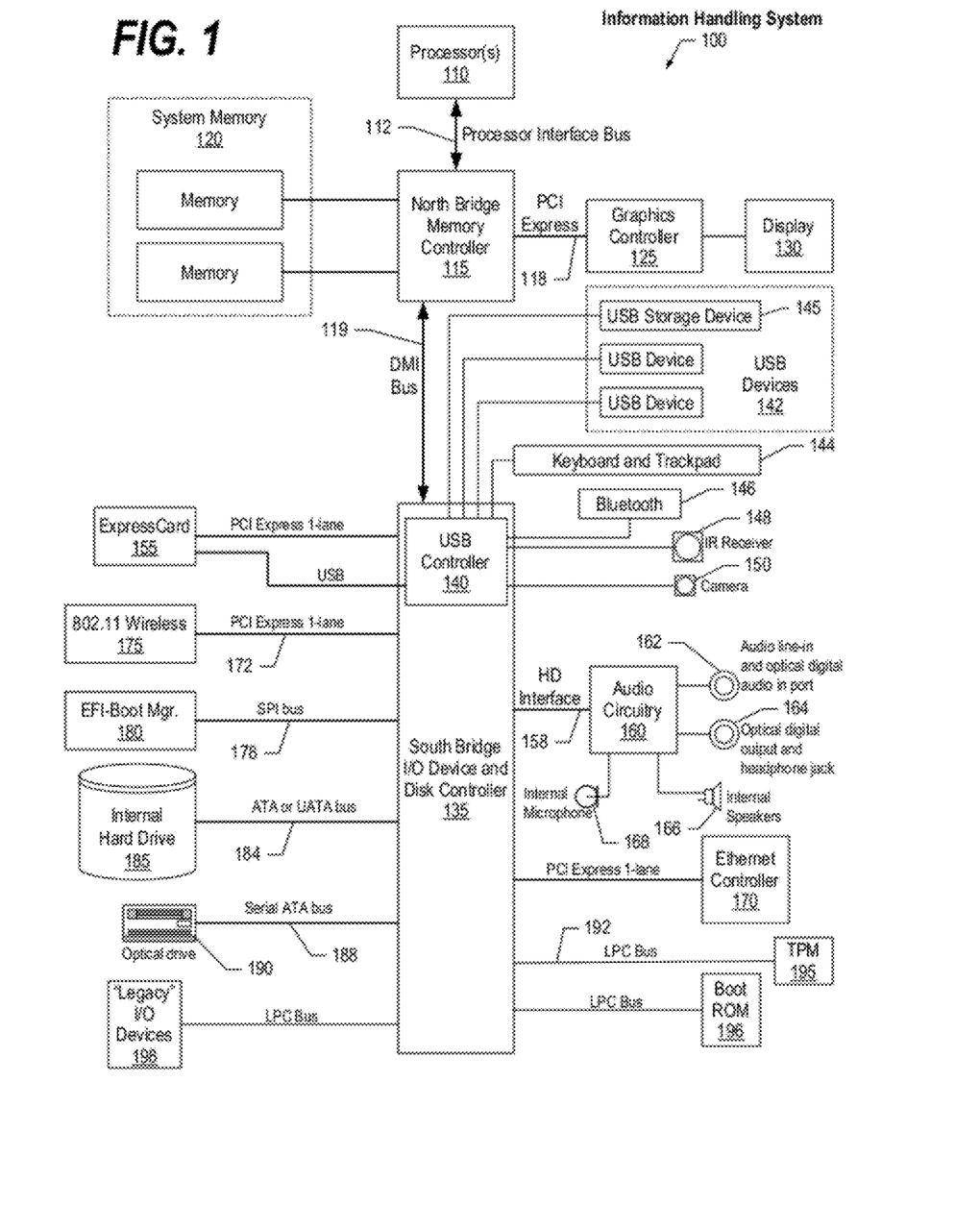
FIG. 1 is a block diagram of a data processing system in which the methods described herein can be implemented.
Figure 2:
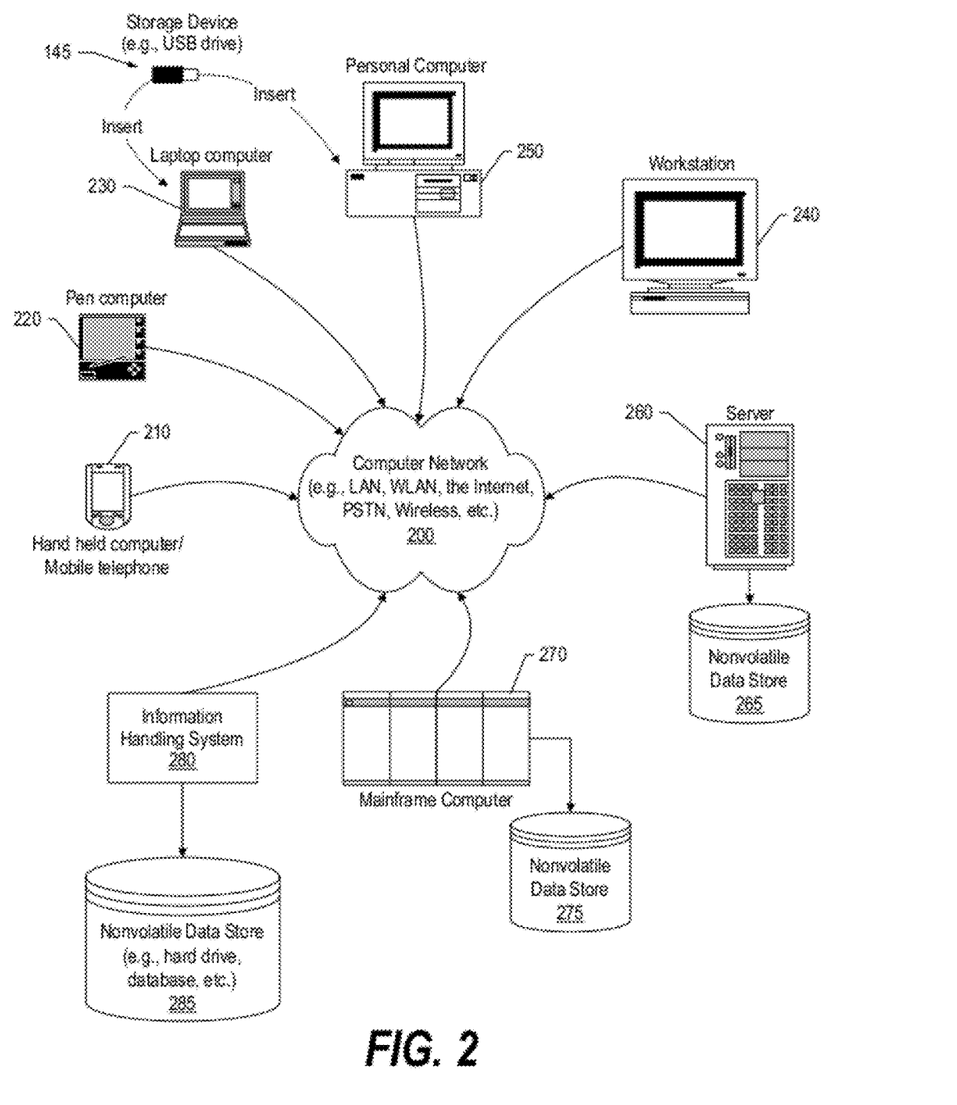
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
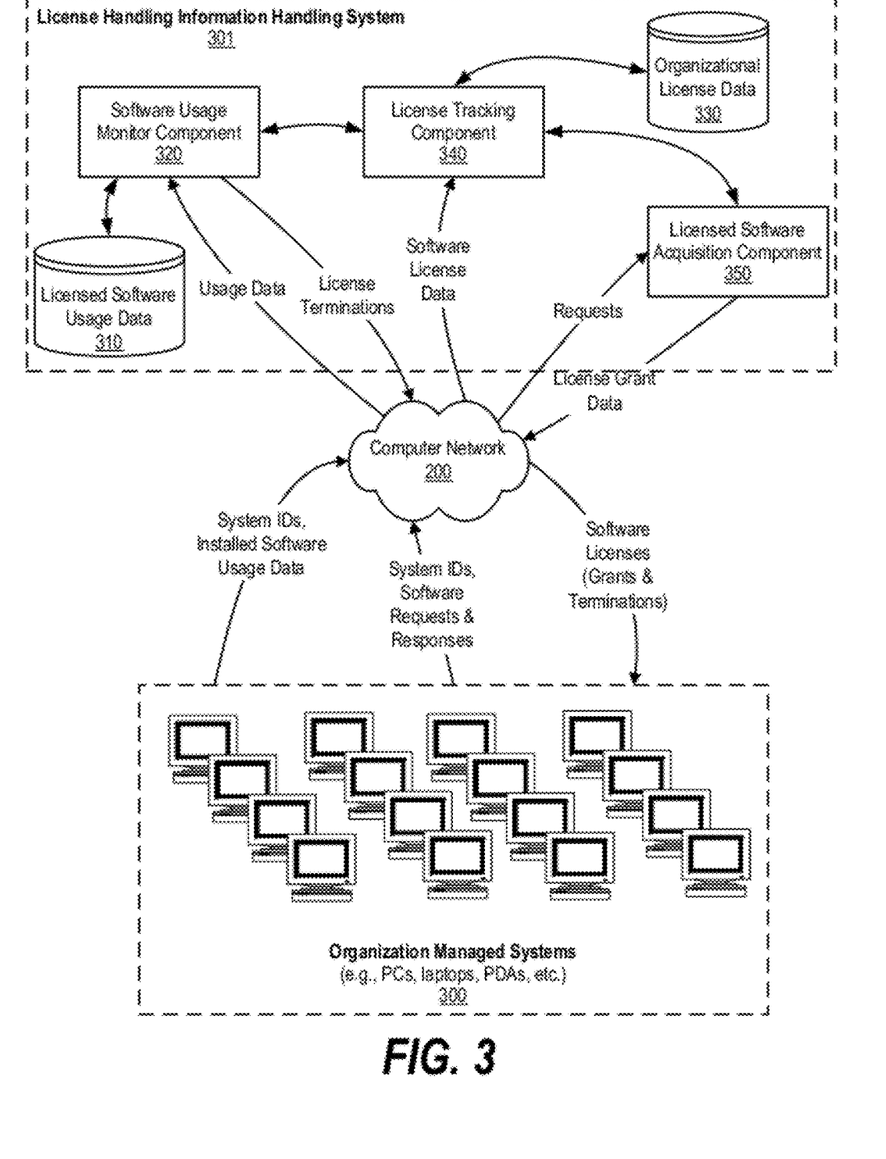
FIG. 3 is a diagram showing license management in an organization.

FIG. 3 is a diagram showing license management in an organization. Organization managed information handling systems 300 include devices such as desktop computer systems, laptop computer systems, and handheld computer systems (e.g., Personal Digital Assistants (PDA), mobile telephones, etc.). The organization purchases a number of licenses to a number of licensed products, such as licensed software, that is installed on the various organization managed information handling systems 300. Because of license terms and cost, sometimes licensed products can only be installed on a limited number of information handling systems 300. The inventions described herein, as defined by the claims, provide an approach to manage these licensed products.

Organization managed information handling systems 300 are linked to one another, and to license handling information handling system 301, via computer network 200. The managed systems each have unique identifiers and provide the license handling information handling system with usage data pertaining to the users' usage of licensed products. In addition, users that require a particular licensed product send an electronic message to license handling information handling system 301 via computer network 200, where the electronic message includes a request for a license to a licensed product, such as a licensed software product.

License handling information handling system 301 uses software usage monitor component 320 which maintains licensed software usage data store 310 to identify current users of the licensed product. License data is received by the license handling information handling system's license tracking component which maintains organizational license data store 330 and also interacts with the license handling information handling system's software usage monitor component 320 as well as license software acquisition component 350 to acquire new licenses to software products.

License handling information handling system 301 uses software usage monitor component 320 to monitor users' usage of licensed products that have been installed on the users computer systems 300. Component 320 performs license terminations when a user is no longer using a licensed product and this data is reported to component 340 to update organizational license data 330 (e.g., reflecting that an additional license is now available and recording the individual users that are currently licensed to use the licensed product, etc.).

License acquisition component 350 of license handling information handling system 301 receives electronic messages from users that require use of a licensed product. Component 350 interacts with license tracking component 340 to ascertain whether a license to the requested licensed product is available. If a license is available (e.g., the organization has paid for ten licenses, but only five are currently being used), then the requesting user is granted a license to the licensed product and the license details are stored in organization license data store 330. On the other hand, if a license is not available, then license tracking component 340 interfaces with usage monitor component 320 to identify a user that has a license but is not fully using the licensed product. If such a user is identified, then component 320 frees up the license by revoking the license from the user that under-utilized the licensed product and provides this license data back to license tracking component 340 which reflects the license termination (revocation) and the granting of the license to the requesting user in organizational license data store 330 and provides the license data to license acquisition component 350 which provides the license grant data back to the requesting user so that the requesting user can legally install and use the licensed product on the user's information handling system. Additionally, if the current users are adequately utilizing the licensed product, then licensed acquisition component 350 may operate to purchase another license to the licensed product. Furthermore, if funds are not available to purchase an additional license, then the requesting user is placed in a queue with other users that are requesting the licensed product. As the licensed product becomes available, licenses are granted to the users in the queue based on a needs calculation (e.g., those with a greater need for the licensed product are given preferential treatment, etc.).

Figure 4:
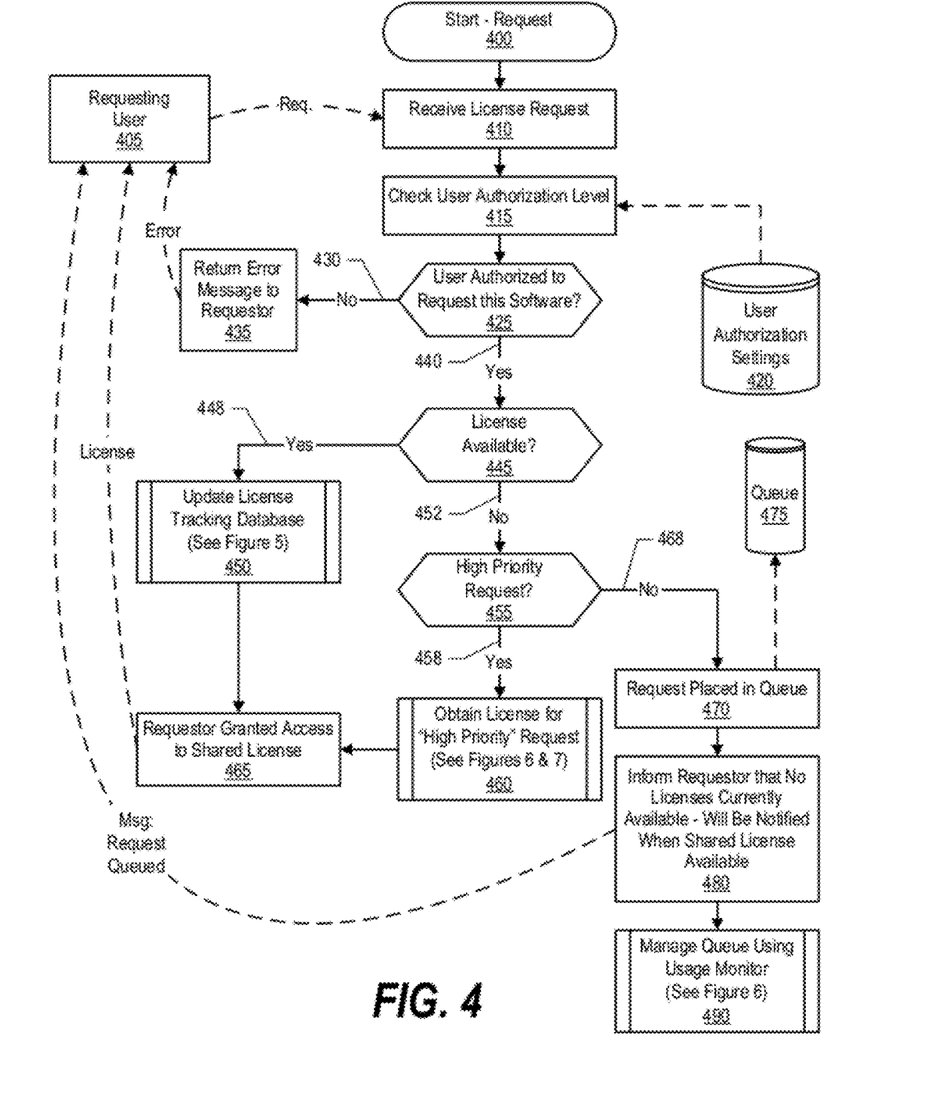
FIG. 4 is a flowchart showing steps involved in a user making a request for a license to a licensed product.

FIG. 4 is a flowchart showing steps involved in a user making a request for a license to a licensed product. License handling information handling system processing is shown commencing at 400 whereupon, at step 410, an electronic message is received over the computer network from a first computer system used by a first user, the first user's message requesting a license to a licensed product. At step 415, a check is made of the requesting user's authorization level using user authorizations settings data store 420 that is accessible to the license handling information handling system. Authorization settings can be managed in a variety of ways. For example, users can be provided a budget to license products or a user's ability to license products can be based on the user's position in the organization so that, for example, higher level employees can license more products than lower level employees.

A determination is made as to whether the user is authorized to request this licensed product (decision 425). If the user is not authorized to request this licensed product (e.g., user not a high enough level employee, does not have enough budgeted funds, etc.), then decision 425 branches to "no" branch 430 whereupon, at step 435, an error message is returned to the requesting user indicating that the user is not authorized to request the licensed product. On the other hand, if the user is authorized to request the licensed product, then decision 425 branches to "yes" branch 440 whereupon, a determination is made as to whether a license is currently available for the licensed product (decision 445). If a license is currently available (e.g., the organization paid for ten licenses but only five are currently being used, etc.), then decision 445 branches to "yes" branch 448 whereupon the license tracking database is updated at predefined process 450 (see FIG. 5 and corresponding text for processing details) and at step 465 the requesting user is granted a license to the licensed product.

Returning to decision 445, if a license is not currently available, then decision 445 branches to "no" branch 452 whereupon a determination is made (decision 455) as to whether the request is a high priority request (e.g., a very high level employee has an urgent need for the licensed product, etc.). If the request is a high priority request, then decision 455 branches to "yes" branch 458 whereupon, at predefined process 460, a license is obtained for a "high priority" request using the steps shown in FIGS. 6 and 7.

On the other hand, if the request is not a high priority request, then decision 455 branches to "no" branch 468 whereupon, at step 470, the request is placed in queue 475. At step 480, the license handling information handling system sends an electronic message to requesting user 405 informing the user that a license is not currently available and that the user will be notified when a license becomes available. The license handling information handling system manages the queue using predefined process 490 (see FIG. 6 and corresponding text for processing details).

Figure 5:
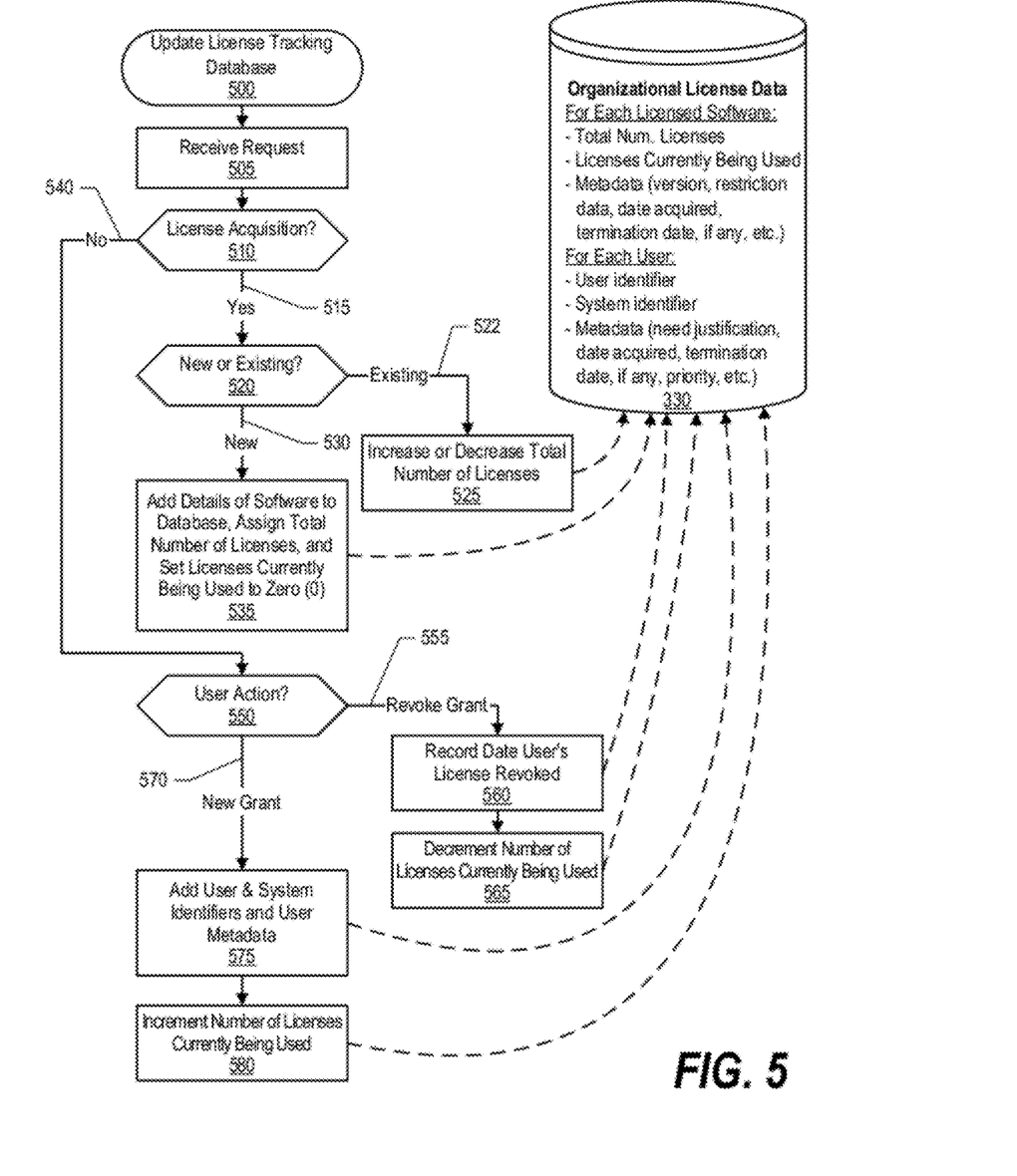
FIG. 5 is a flowchart showing steps involved in updating a license tracking database maintained by the license handling information handling system.

FIG. 5 is a flowchart showing steps involved in updating a license tracking database maintained by the license handling information handling system. Processing commences at 500 whereupon, at step 505 a request is received. A determination is made as to whether the request pertains to acquisition of a license to a licensed product (decision 510). If the request pertains to acquisition of a license to a licensed product, then decision 510 branches to "yes" branch 515 whereupon a determination is made as to whether the licensed product is new to the organization or is already being licensed by the organization. If the licensed product is already being licensed, then decision 520 branches to "existing" branch 522 whereupon, at step 525, the number of licenses to the licensed product are increased or decreased according to the license acquisition request. The details of licensed products is maintained in organizational licensed data store 330. As shown, for each licensed product, the system keeps track of the total number of licenses that have been purchased, the licenses that are currently being used, metadata regarding the licenses (e.g., product version information, usage restriction data, the date the license was acquired, the termination date of the license, etc.). Additionally, for each user in the organization that has been granted a license to the licensed product, the system records the user's identifier, the computer system identifier where the licensed product is installed (if applicable), and metadata regarding the user (e.g., need justification, date acquired, termination date, if any, priority, etc.). Returning to decision 520, if the license is a new acquisition by the organization, then decision 520 branches to "new" branch 530 whereupon, at step 535, the details of the license are added to organizational license data store 330 including the total number of licenses that the organization has purchased. Because this is a new license to the organization, the current number of licenses being used by users in the organization is set to zero. As users request licenses to the licensed product, this number of licenses currently being used will be incremented.

Returning to decision 510, if the request is not for a license acquisition, then decision 510 branches to "no" branch 540 whereupon a determination is made as to whether the request pertains to an individual user's request or action (decision 550). If the user action is to revoke a previously granted license to a licensed product, then decision 550 branches to "revoke grant" branch 555 whereupon, at step 560 the date that the user's license revocation to the licensed product is recorded and, at step 565, the total number of licenses currently being used by users in the organization is decremented.

On the other hand, if the user action is for a new license grant to a licensed product, then decision 550 branches to "new grant" branch 570 whereupon, at step 575, the user and system identifiers are added to organization license data store 330 along with metadata pertaining to the user. At step 580, the total number of licenses currently being used by users in the organization is incremented.

Figure 6:
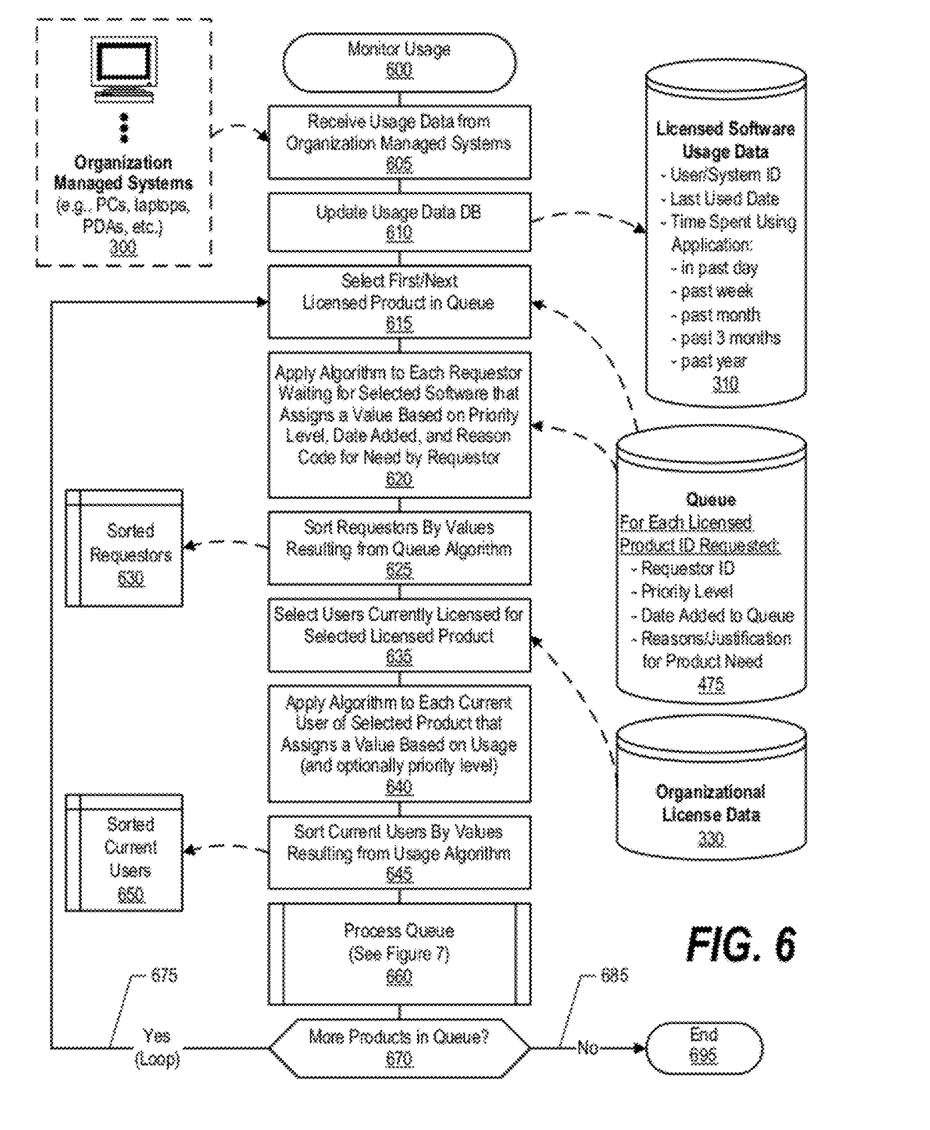
FIG. 6 is a flowchart showing steps taken by the license handling information handling system to monitor software usage.

FIG. 6 is a flowchart showing steps taken by the license handling information handling system to monitor software usage. Processing commences at 600 whereupon, at step 605, usage data is received from organization managed computer systems 300. At step 610, the users' usage of various licensed products is reflected in licensed product usage data store 310. For example, the licensed product usage data can include the user's identifier, the system identifier, the date the licensed product was last used, the amount of time the user spends using the licensed product in the past day, week, month, etc.

At step 615, the first licensed product identifier is selected from queue 475 after sorting the queue by the various licensed products that have been requested. At step 620, an algorithm (calculation) is applied to each user requesting the selected licensed product. The calculation results in a product need score that corresponds to the need of the requesting users for the licensed product. For example, the product need score could be based on a combination of the priority level, the date the request was added to the queue, and the reasons and justifications the requesting user has for the licensed product. At step 625, the requestors for the licensed product are sorted based on the calculated product need scores corresponding to each of the users and the list is stored in sorted requested memory area 630.

At step 635, the users that are currently licensed for the selected licensed product are selected. At step 640, the system calculates current user product need scores corresponding to needs analyses of the current users pertaining to the licensed product. For example, the current user product need scores can be calculated using the amount of time the users spend using the licensed product, the date the product was last used by the users, and other factors included in licensed software usage data. At step 645 the current users of the licensed product are sorted based on the current user product need scores corresponding to each of the current users. The sorted current users are stored in memory area 650. The queue of users waiting for licenses to the selected licensed product is processed at predefined process 660 (see FIG. 7 and corresponding text for processing details).

A determination is made as to whether there are more licensed products in queue 475 to process (decision 670). If there are more licensed products to process, decision 670 branches to "yes" branch 675 which loops back to step 615 in order to select the next licensed product and process it as described above. This looping continues until all of the products in queue 475 have been processed, at which point decision 670 branches to "no" branch 685 and processing ends at 695.

Figure 7:
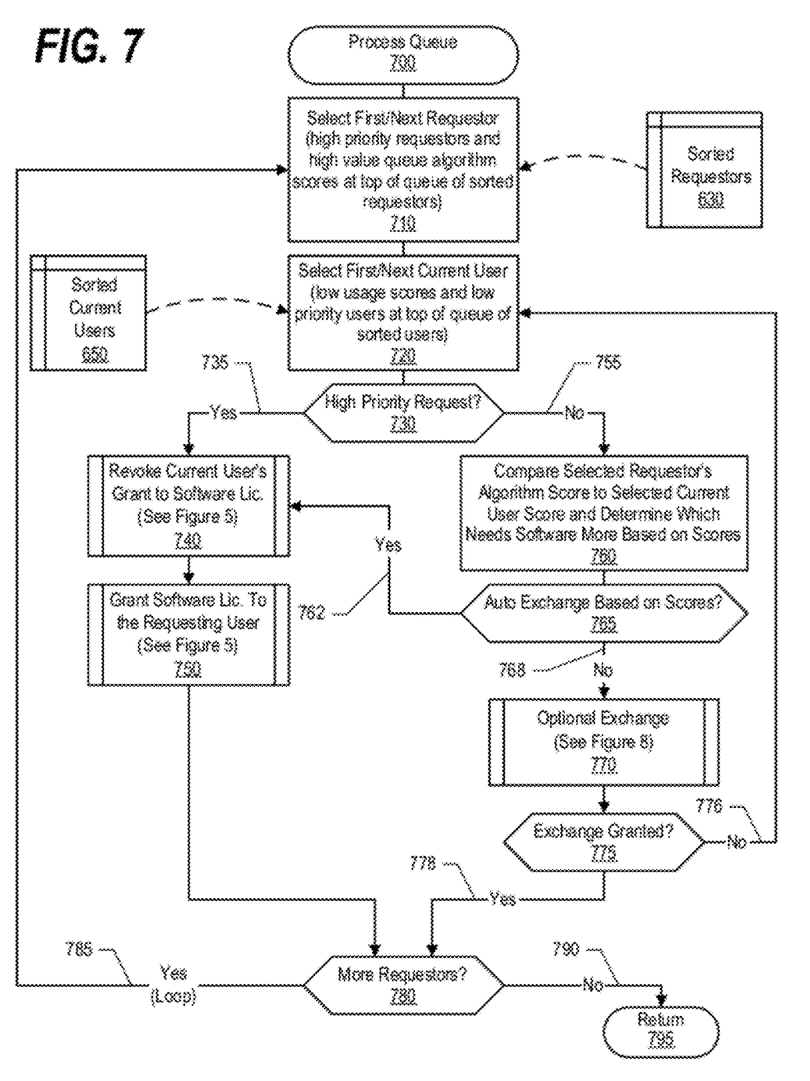
FIG. 7 is a flowchart showing steps taken to process a queue of uses waiting for licenses to a licensed product.

FIG. 7 is a flowchart showing steps taken to process a queue of uses waiting for licenses to a licensed product. Processing commences at 700 whereupon, at step 710, the first requestor (user) is selected from sorted requestors memory area 630. Sorted requestors memory area 630 was previously sorted so that users with higher calculated needs analysis scores are at the top of the queue and are therefore the first users selected from memory area 640. At step 720, the first current user is selected from sorted current users memory area 650. Sorted current users memory area 650 was previously sorted so that current users with lower calculated needs analyses scores are at the top of the queue and are therefore the first current users of the licensed product selected from memory area 650.

A determination is made as to whether the request is a "high priority" request (decision 730). If the request is a high priority request, then decision branches to "yes" branch 735 whereupon, at predefined process 740, the selected current user's grant to the licensed product is revoked (see FIG. 5 and corresponding text for processing details), and at predefined process 750, the selected requestor is granted a license to the licensed product (see FIG. 5 and corresponding text for processing details). On the other hand, if the request is not a high priority request, then decision 730 branches to "no" branch 755 whereupon, at step 760, the selected requester's user product need score is compared to the selected current user product need score. A determination is made as to whether, based on the comparison, whether the current user's license should be transferred to the requesting user automatically (decision 765). For example, if the selected current user has not used the licensed product in several months and the selected requesting user has a high product needs score, then an automatic exchange may be appropriate. If the transfer should be made automatically, then decision 765 branches to "yes" branch 762 whereupon predefined processes 740 and 750 are performed in order to revoke the current user's grant to the licensed product and grant the license to the user requesting the licensed product.

Figure 8:
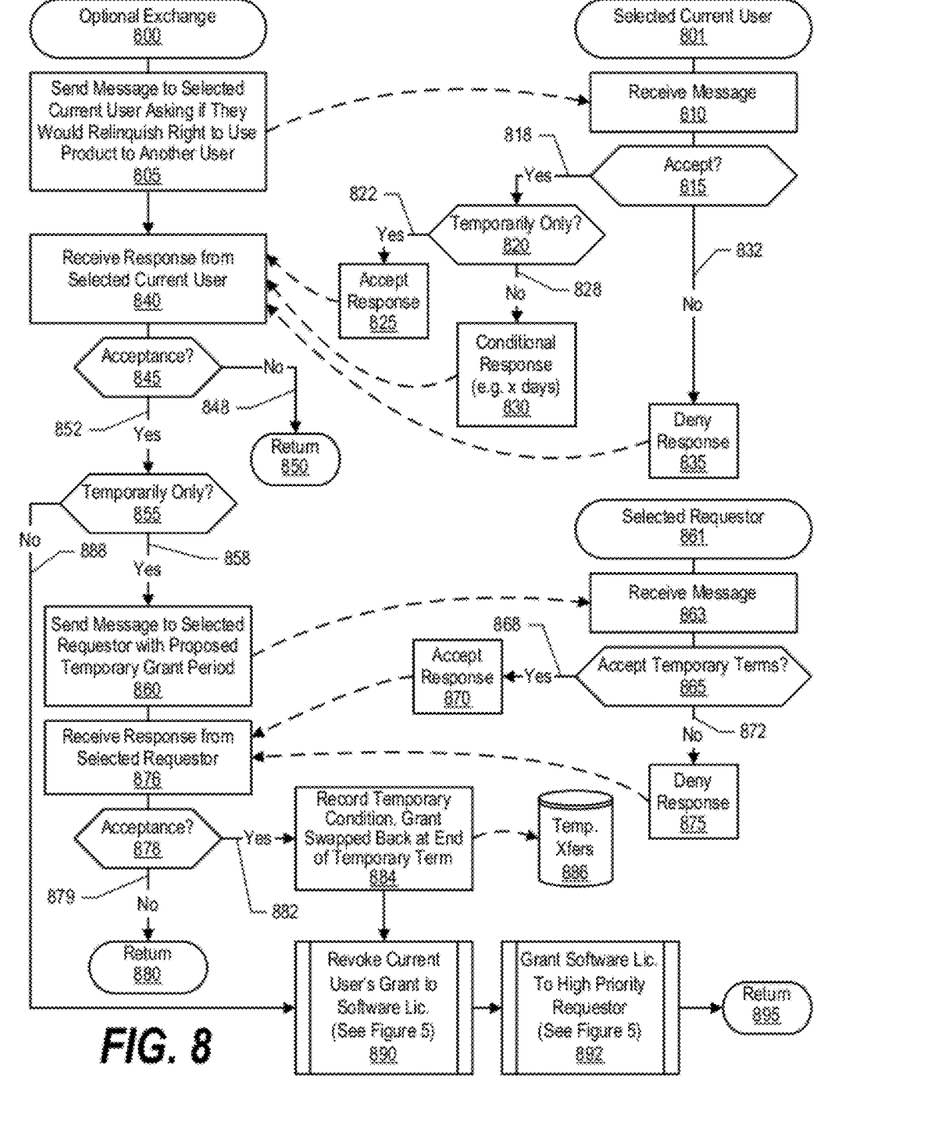
FIG. 8 is a flowchart showing steps taken to execute an optional exchange of a license between a licensed user and an unlicensed user.

Returning to decision 765, if the scores do not warrant an automatic exchange between the current user and the requesting user, then decision 765 branches to "no" branch 768 whereupon, at predefined process 770, an optional exchange process is performed (see FIG. 8 and corresponding text for processing details). During the optional exchange, the current user is asked whether he/she will give up the license to the licensed product (either permanently or temporarily) so that the requesting user can obtain the license. A determination is made as to whether the optional exchange process resulted in an exchange between the current user and the requesting user (decision 775). If an exchange did not take place (e.g., the current user refused to give up his or her license to the licensed product, etc.), then decision 775 branches to "no" branch 776 which loops back to select the next current user from the list of sorted users (memory area 650) and re-perform the exchange processing described above for steps 730 through 775. This looping is performed until either there are no more current users of the licensed product to process or until the requesting user receives the license grant from one of the current users. When this happens, decision 775 branches to "yes" branch 778, exiting the loop.

A determination is made as to whether there are more users requesting a license to the licensed product (decision 780). If there are more users requesting a license, then decision 780 branches to "yes" branch 785 which loops back to step 710 to select the next requestor from sorted requestors memory area 630. This looping is performed until there are no more requestors to process, at which point, decision 780 branches to "no" branch 790 and processing returns to the calling routine at 795.

FIG. 8 is a flowchart showing steps taken to execute an optional exchange of a license between a licensed user and an unlicensed user. License handling information handling system processing commences at 800 whereupon, at step 805, the license handling information handling system sends an electronic message to the selected current user asking the current user if they would relinquish their license to the licensed product to another user. Selected current user processing commences at 801 whereupon, at step 810, the selected current user receives the electronic message from the license handling information handling system. The selected current user makes a decision as to whether to accept the request (decision 815). If the selected current user chooses to accept the request and relinquish his or her license to the licensed product, then decision 815 branches to "yes" branch 818 whereupon a determination is made as to whether the current user only wishes to relinquish the license for a temporarily or permanently (decision 820). If the current user agrees to permanently relinquish the license, then decision 820 branches to "yes" branch 822 whereupon, at step 825, the selected current user sends an acceptance message back to the license handling information handling system. On the other hand, if the selected current user only agrees to relinquish the license temporarily, then decision 820 branches to "no" branch 828 whereupon, at step 830, a conditional response is returned to the license handling information handling system indicating the time period (e.g., number of days, etc.) that the selected current user is willing to relinquish his or her license to the licensed product. Returning to decision 815, if the selected current user does not wish to relinquish his or her license to the licensed product, then decision 815 branches to "no" branch 832 whereupon, at step 835, a denial response is returned to license handling information handling system.

License handling information handling system processing resumes at step 840 when the response is received from the selected current user. A determination is made as to whether the selected current user has agreed (accepted) to relinquish the license either permanently or temporarily (decision 845). If the selected current user did not agree to relinquish the license, either permanently or temporarily, then decision 845 branches to "no" branch 848 whereupon processing returns to the calling routine at 850. On the other hand, if the selected current user did agree to relinquish the license, either permanently or temporarily, then decision 845 branches to "yes" branch 852 whereupon a determination is made as to whether the selected current user only agreed to temporarily relinquish the license (decision 855). If the selected current user only agreed to relinquish the license temporarily, then decision 855 branches to "yes" branch 858 whereupon, at step 860, the license handling information handling system sends an electronic message to the selected requesting user with the proposed temporary license grant (e.g., license granted for a number of days, etc.).

Processing performed by the selected requesting user is shown commencing at 861 whereupon, at step 863, the electronic message is received from the license handling information handling system. The selected requesting user decides whether to accept the temporary terms (decision 865). If the temporary terms are acceptable, then decision 865 branches to "yes" branch 868 whereupon, at step 870, an acceptance response is returned to the license handling information handling system. On the other hand, if the temporary terms are not acceptable (e.g., the requesting user needs to use the licensed product for a long term assignment but the selected current user is only willing to relinquish the license for a few days, etc.), then decision 865 branches to "no" branch 872 whereupon, at step 875, a denial response is returned to the license handling information handling system.

Returning to processing performed by the license handling information handling system, at step 876, the response is received from the selected requesting user. A determination is made as to whether the selected requesting user accepted the temporary terms for the license grant (decision 878). If the selected requesting user did not accept the temporary terms, then decision 878 branches to "no" branch 879 whereupon processing returns to the calling routine at 880. On the other hand, if the selected current user accepted the temporary license grant terms, then decision 878 branches to "yes" branch 882 whereupon, at step 884, the terms of the temporary license grant are recorded in temporary license grant transfer data store 886 recording both the identifier of the selected current user and the identifier of the selected requesting user along with the licensed product identifier and the time period (term) that the temporary license has been granted from the selected current user to the selected requesting user. At the end of the term, the license handling information handling system will swap the license back so that the selected current user will regain the license at the end of the term and the temporary license granted to the selected requesting user will be revoked at the end of the term. In order to facilitate the temporary transfer from the selected current user to the selected requesting user, at predefined process 890, the selected current user's license to the licensed product is revoked (see FIG. 5 and corresponding text for processing details) and, at predefined process 892, the license handling information handling system grants the selected requesting user the license to the licensed product (again see FIG. 5 and corresponding text for processing details). Processing then returns to the calling routine at 895.

Returning to decision 855, if the selected current user agreed to permanently relinquish his or her license grant to the licensed product, then decision 855 branches to "no" branch 888 whereupon predefined processes 890 and 892 are performed in order to revoke the selected current user's license to the licensed product and to grant license to the licensed product to the selected requesting user. Processing then returns at 895.

One of the preferred implementations of the invention is a combination of client and server applications, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
   receiving, over a computer network, a request at a license handling information handling system from a first computer system utilized by a first user of an organization, wherein the first user requests a license to a licensed product;
   identifying a second user in the organization, wherein the second user currently has a license to the licensed product;
   in response to the identifying, sending a first electronic message from the license handling information handling system to the second user, wherein the first electronic message requests that the second user relinquish the second user's license;
   receiving, at the license handling information handling system, a second electronic message from the second user, wherein the second electronic message indicates that the second user will relinquish the second user's license for a temporary time period;
   sending, from the license handling information handling system, a third electronic message to the first user, wherein the third electronic message includes the temporary time period;
   receiving, at the license handling information handling system, a response from the first user, the response indicating whether the first user accepts the temporary time period;
   in response to the first user accepting the temporary time period, revoking the license of the second user to the licensed product from the license handling information handling system; and
   in response to the revoking, granting the first user the license to the licensed product from the license handling information handling system.

2. The method of claim 1 further comprising:
   automatically revoking, by the license handling information handling system, the first user's license to the licensed product upon an expiration of the time period; and
   automatically granting, by the license handling information handling system, the second user the license to the licensed product upon the expiration of the time period.

3. The method of claim 1 wherein identifying the second user further comprises:
   calculating a first user product need score corresponding to a needs analysis of the first user pertaining to the licensed product;
   calculating one or more current user product need scores corresponding to one or more needs analyses of one or more current users pertaining to the licensed product;
   comparing the calculated first user product need score to the one or more current user product need scores; and
   selecting the second user based on the comparison, wherein the first user product need score is better than the current user product need score corresponding to the second user.

4. The method of claim 1 wherein a plurality of requests for licenses to the licensed product, including the first user's request, are received at the license handling information handling system, wherein the method further comprises:
   storing the plurality of requests in a queue managed by the license handling information handling system;
   sorting the plurality of stored requests by a product need score corresponding to each of the requests; and
   selecting the license request of the first user based on the first user product need score being better than the other product need scores corresponding to the plurality of stored requests.

5. A computer program product stored in a computer readable memory, comprising functional descriptive material that, when executed by a license handling information handling system, causes the license handling information handling system to perform actions comprising:
   receiving, over a computer network, a request from a first computer system utilized by a first user of an organization, wherein the first user requests a license to a licensed product;
   identifying a second user in the organization, wherein the second user currently has a license to the licensed product;
   in response to the identifying, sending a first electronic message to the second user, wherein the first electronic message requests that the second user relinquish the second user's license;
   receiving a second electronic message from the second user, wherein the second electronic message indicates that the second user will relinquish the second user's license for a temporary time period;

sending a third electronic message to the first user, wherein the third electronic message includes the temporary time period;

receiving a response from the first user, the response indicating whether the first user accepts the temporary time period;

in response to the first user accepting the temporary time period, revoking the license of the second user to the licensed product; and in response to the revoking, granting the first user the license to the licensed product.

6. The computer program product of claim 5 wherein the actions further comprise:

automatically revoking the first user's license to the licensed product upon an expiration of the time period; and automatically granting the second user the license to the licensed product upon the expiration of the time period.

7. The computer program product of claim 5 wherein the actions further comprise identifying the second user by performing actions comprising:

calculating a first user product need score corresponding to a needs analysis of the first user pertaining to the licensed product;

calculating one or more current user product need scores corresponding to one or more needs analyses of one or more current users pertaining to the licensed product;

comparing the calculated first user product need score to the one or more current user product need scores; and selecting the second user based on the comparison, wherein the first user product need score is better than the current user product need score corresponding to the second user.

8. The computer program product of claim 5 wherein a plurality of requests for licenses to the licensed product, including the first user's request, are received at the license handling information handling system, and wherein the actions further comprise:

storing the plurality of requests in a queue managed by the license handling information handling system;

sorting the plurality of stored requests by a product need score corresponding to each of the requests; and selecting the license request of the first user based on the first user product need score being better than the other product need scores corresponding to the plurality of stored requests.

9. A license handling information handling system comprising:

one or more processors;

a memory accessible by at least one of the processors;

a nonvolatile storage area accessible by at least one of the processors;

a network adapter that connects the license handling information handling system to a computer network; and a set of instructions stored in the memory and executed by at least one of the processors in order to perform actions comprising:

receiving, over a computer network, a request from a first computer system utilized by a first user of an organization, wherein the first user requests a license to a licensed product;

identifying a second user in the organization, wherein the second user currently has a license to the licensed product;

in response to the identifying, sending a first electronic message to the second user, wherein the first electronic message requests that the second user relinquish the second user's license;

receiving a second electronic message from the second user, wherein the second electronic message indicates that the second user will relinquish the second user's license for a temporary time period;

sending a third electronic message to the first user, wherein the third electronic message includes the temporary time period;

receiving a response from the first user, the response indicating whether the first user accepts the temporary time period;

in response to the first user accepting the temporary time period, revoking the license of the second user to the licensed product; and in response to the revoking, granting the first user the license to the licensed product.

10. The license handling information handling system of claim 9 wherein the actions further comprise:

automatically revoking the first user's license to the licensed product upon the expiration of the time period; and automatically granting the second user the license to the licensed product upon the expiration of the time period.

11. The license handling information handling system of claim 9 wherein identifying the second user further comprises actions comprising:

calculating a first user product need score corresponding to a needs analysis of the first user pertaining to the licensed product;

calculating one or more current user product need scores corresponding to one or more needs analyses of one or more current users pertaining to the licensed product;

comparing the calculated first user product need score to the one or more current user product need scores; and selecting the second user based on the comparison, wherein the first user product need score is better than the current user product need score corresponding to the second user.

12. The license handling information handling system of claim 9 wherein a plurality of requests for licenses to the licensed product, including the first user's request, are received at the license handling information handling system and wherein the instructions perform further actions comprising:

storing the plurality of requests in a queue managed by the license handling information handling system;

sorting the plurality of stored requests by a product need score corresponding to each of the requests; and selecting the license request of the first user based on the first user product need score being better than the other product need scores corresponding to the plurality of stored requests.

* * * * *